Feb. 3, 1970 R. W. CUSHING 3,493,900

LINE RADIATION FILTER

Filed Nov. 15, 1965

INVENTOR
Richard W. Cushing

By Hofgren, Wegner, Allen, Stellman & McCord
ATTORNEYS

United States Patent Office 3,493,900

Patented Feb. 3, 1970

3,493,900
LINE RADIATION FILTER

Richard W. Cushing, Forest Park, Ill., assignor to Warwick Electronics Inc., a corporation of Delaware Filed Nov. 15, 1965, Ser. No. 507,799
Int. Cl. H03h *7/10*
U.S. Cl. 333—70 3 Claims

ABSTRACT OF THE DISCLOSURE

A radiation suppression filter for a two conductor line, consisting of a pair of concentric solenoid coils each connected in series with a different line. One solenoid coil is wound in an opposite sense to the other coil, and is supported within the other to provide reverse mutual coupling with a high coefficient of coupling in order to pass AC energy of lower, power frequencies while partially cancelling AC energy of higher frequencies.

This invention relates to a radiation suppression filter, and more particularly to a radiation suppression filter which both attenuates and cancels undesired AC energy in a two conductor circuit.

Alternating current (AC) energy covering a broad frequency range is often undesirably coupled from electrical generating, amplifying, or commutating equipment to an AC power line connecting the equipment with a source of AC power. The broad frequency energy is radiated from the power line into space, causing interference with other electronic equipment.

For example, a television signal receiver couples significant high level energy to the AC power cord connecting the receiver with a conventional 60 cycle power system. This energy is partly developed in the receiver by amplification of the IF spectrum, e.g. from 40 to 50 megacycles, and by amplification of various locally generated beat frequencies. Examples of troublesome beat frequencies include the 4.5 megacycle beat between the converted picture and sound carriers, and the 3.58 megacycle beat between the converted picture carrier and the color carrier in a color television receiver.

The television receiver also generates significant energy due to various local oscillators in the tuner, oscillating type FM sound detectors, and the color subcarrier oscillator in color television receivers. Other generating sources include the horizontal scan circuitry whose 15 kc. output signal is rich in harmonics.

A filter network is often inserted in the AC power line to attenuate this broadband energy, thereby reducing the level of radiation from the power line.

In order to prevent a power breakdown across the power line, the filter should desirably be constructed without a lumped impedance element, as a capacitor, connected between the two conductors of the power line. A mere inductive choke, which fulfills these requirements, is not sufficiently effective to adequately suppress high level AC energy without appreciable loss at power line frequency, large physical size and high cost.

A principal object of this invention is to provide an improved filter for attenuating broad frequency energy in a two conductor circuit.

Another object of this invention is the provision of a filter connected in series with a pair of power lines connecting a source of AC power with an electrical device having electromagnetic energy in a frequency spectrum above the frequency of energy from the AC power source.

One feature of this invention is the provision of a filter for a two conductor circuit which suppresses undesirable broad frequency energy by both attenuation and cancellation.

Another feature of this invention is the provision of a radiation suppression filter for a two conductor circuit which eliminates lumped impedance elements connected across the two conductor lines.

Still aother feature of this invention is the provision of a radiation suppression filter consisting of an inductor connected in series with each power line of a two conductor circuit, which have reverse mutual coupling to cancel AC energy occupying a broad frequency spectrum.

A still further feature of this invention is the provision of a radiation suppression filter for a two conductor power line, consisting of a first solenoid coil connected in series with one conductor, and a second solenoid coil of larger diameter than the first coil and concentric therewith, connected in series with the other conductor. The two solenoid coils have reverse mutual coupling to partially cancel undesired AC energy. The first solenoid may be supported within the second solenoid, providing a compact filter with a high coefficient of coupling therebetween.

Further features and advantages of the invention will be apparent from the following specification and from the drawings, in which.

Figures 1, 2, 3:
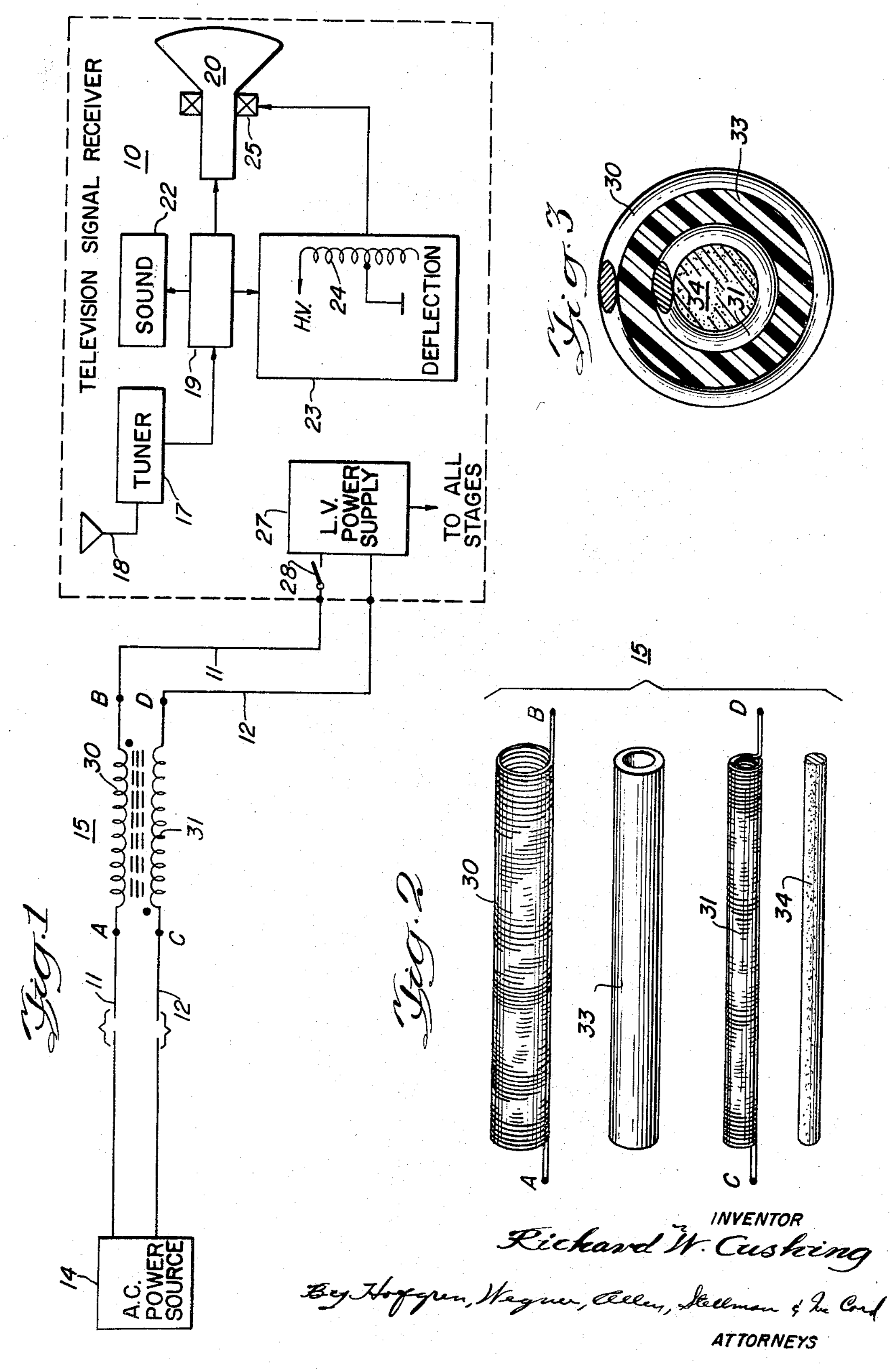
FIGURE 1 is a schematic and block diagram illustrating the novel radiation suppression filter used in conjunction with a television signal receiver.
FIGURE 2 is an exploded view of a specific construction for the filter.
FIGURE 3 is a side view of the construction of FIGURE 2, assembled to form the radiation suppression filter.

While an illustrative embodiment of the invention is shown in the drawings and will be disclosed in detail herein, the invention is susceptible of embodiment in several different forms and should be understood that the present disclosure is to be considered as an exemplification of the principles of the invention and is not intended to limit the invention to the embodiment illustrated. The scope of the invention will be pointed out in the appended claims.

Turning now to FIGURE 1, a load or television signal receiver 10 is connected through a pair of power conductors 11 and 12 to a source 14 of AC power. A novel radiation suppression filter 15 is connected in series with the AC conductors between receiver 10 and source 14.

Television signal receiver 10, illustrated within the broken lines, includes a tuner 17 for converting television signals at an antenna 18 into signals of intermediate frequencies, as 40–50 mc. coupled to a signal processing stage 19 which typically includes an IF amplifier, a picture detector, and a video amplifier. A video output signal from stage 19, which may include both luminance and chrominance signals, is coupled to a television cathode ray tube 20. Signal processing stage 19 also has an output signal coupled to a sound channel 22, and a synchronizing signal output coupled to a deflection stage 23.

A sweep transformer 24 in deflection stage 23 provides horizontal sweep currents and a high voltage (HV) potential for the television receiver. The horizontal sweep currents generated by deflection stage 23 are coupled to deflection coils 25 for picture tube 20.

A low voltage power supply 27 provides DC output voltages which are coupled to all stages of receiver 10. Power supply 27 is connected to power source 14, as a conventional 60 cycle AC voltage distribution system, when an "on-off" switch 28 is closed.

A broad spectrum of high level energy is coupled to power conductors 11 and 12 from television receiver 10. Amplification by the IF amplifier in stage 19 of the IF frequencies at 40–50 megacycles and amplification of the video frequencies, by the video amplifier in stage 19, and various frequency beats as 3.58 mc., 4.5 mc. and their harmonics contribute to this energy. Receiver 10 also generates significant energy from various sources including the local oscillator in tuner 17, oscillating type sound detectors in sound stage 22, and the horizontal scan circuitry of deflection stage 23 which produces energy at 15 kc. rich in harmonics. Spectral line energy from the horizontal deflection circuit is strong from 15 kc. through 2 megacycles and higher.

The complex method by which the energy of the television receiver is coupled to the power line conductors, and suitable methods for measuring the radiation interference output on power lines 11 and 12 are explained in a paper "IRE Standards on Receivers," 54 IRE 17 S1, published in 1954, also found in the "Proceedings of the IRE," volume 42, No. 9, September 1954.

In a typical television receiver, the power line conducted radiation occupies a broad frequency spectrum from 15 kc.–25 mc. and may have amplitudes in excess of 2100 microvolts, with a large amount of energy exceeding 1500 microvolts amplitude. Filter 15, which should be on connected as close to supply 27 of receiver 10 as possible, suppresses this undesired energy to magnitudes of less than 100 microvolts over a frequency range from 450 kc. to 25 megacycles as required by FCC specification.

Filter 15 is constructed from an inductor 30, having ends A and B connected in series with line 11, and an inductor 31, having ends C and D connected in series with line 12. Inductors 30 and 31 have reverse mutual coupling, that is the inductors are so related that a high inductance is presented at terminals A and C if the terminals B and D are short circuited. The reverse mutual coupled inductors preferably have a high coefficient of coupling K therebetween. For example, a specific filter was formed from coils which each had an inductance of 260 microhenries. When coupled together with a $K=.97$, the inductance from A to D with B and C short circuited, i.e., opposed, was 10 microhenries, while the inductance from A to C with B and D short circuited was 1000 microhenries. With this construction, filter 15 has little effect on the 60 cycle voltage from power source 14, but substantially suppresses the higher frequency broadband energy generated and amplified by receiver 10. This suppression results both from the increased inductive reactance of inductors 30 and 31 with frequency, and from a cancellation effect caused by the reverse mutual coupling of the coils.

In FIGURES 2 and 3, a specific construction for filter 15 is illustrated. Inductor 30 is formed from a coil of of wire, wound clockwise as viewed in FIGURE 2 in the shape of a solenoid with a single layer of turns. Inductor 31 is similarly formed from a solenoid shaped coil of wire with a single layer of turns but wound counterclockwise. In one specific filter, each coil was formed from 105 turns of number 24 gauge insulated wire. Inductor 31 is physically smaller than inductor 30, and is concentrically mounted within the solenoid coil of inductor 30, as viewed in FIGURE 3. A hollow cylindrical spacer 33 is inserted between conductors 30 and 31, formed from an electrical insulating material as ceramic, glass, or asbestos.

A core 34 of high permeability and low loss, such as ferrite or powered iron, is inserted concentrically within coil 31. A wax coating may be applied over the entire assembled unit to mechanically secure the components, to insulate the outer inductor 30, and to provide thermal inertia which prevents the entire unit from flaming should B and D ever be short circuited due to breakdown or other causes.

With the construction illustrated in FIGURE 3, a high coefficient of coupling, typically from .9 to .95, is achieved. It is also desirable that the filter have a minimum distributed capacitance between the windings, which in the construction illustrated is typically 20 picofarads.

Because the direction of winding of the coils is reversed, the leads to power source 14 extend from adjacent ends A and C of the inductors. Similarly, the power lines to receiver 10 extend from the adjacent ends B and D of inductors 30 and 31, allowing filter 15 to be conveniently wired and mounted in the receiver. The coils could be wound in the same direction and reversely connected in the circuit with the high frequency current producing opposing fields.

I claim:

1. In a circuit in which AC energy from a load may be undesirably coupled to a pair of conductors connected with an AC power source at a lower frequency than the frequency of said energy, a filter for suppressing radiation of the AC energy, comprising: a first inductor connected in series with one of said conductors and a second inductor connected in series with the other of said conductors, each of said inductors comprising a solenoid coil wound with a single layer of turns, said second inductor having a larger diameter than said first inductor; and means supporting said first inductor inside of and generally aligned with said second inductor, said first and second inductors having reverse mutual coupling with a high coefficient of coupling therebetween for partially cancelling the undesired AC energy.

2. A radiation suppression filter for reducing the level of AC energy which is undesirably coupled from a load to a pair of power lines connected with an AC power source at a lower frequency than the frequency of said energy, comprising: a first inductor connected in series with one of said lines and a second inductor connected in series with the other of said lines, said first inductor comprising a coil of wire wound in a first direction in the shape of a helix, said second inductor comprising a coil of wire wound in a direction opposed to said first direction in the shape of a helix of larger diameter than the helix of said first inductor; means supporting said first inductor concentrically within said second inductor with the lines going to said power source extending from adjacent ends of the first and second inductors and the lines going to said load extending from different adjacent ends of the first and second inductors, providing reverse mutually coupled inductors with a high coefficient of coupling therebetween for partially cancelling the undesired AC energy.

3. A radiation suppression filter for reducing the level of AC energy which is undesirably coupled to a pair of power lines connected with a lower frequency AC power source, comprising: a ferrite core; a first helical coil of wire wound around said core, said coil being connected in series with one of the power lines; insulating means surrounding the first helical coil and concentric with the cores; a second helical coil of wire wound around said insulating means, said second coil being wound in a direction opposite to the direction the first coil is wound, said second coil being connected in series with the other of the power lines, said first and second coils having reverse mutual coupling with a high coefficient of coupling therebetween, for partially cancelling said undesired AC energy.

References Cited

UNITED STATES PATENTS

| | | | |
|---|---|---|---|
| 3,041,523 | 6/1962 | Kuba | 321—16 |
| 3,340,458 | 9/1967 | Keller | 321—10 |
| 3,015,773 | 1/1962 | Herrman | 323—75 |
| 3,223,920 | 12/1965 | Sasaki | 323—44 |
| 3,191,132 | 6/1965 | Mayer | 333—79 |
| 3,125,733 | 3/1964 | Holinbeck | 333—79 |
| 2,470,307 | 5/1949 | Guanella | 333—25 |
| 2,277,775 | 3/1942 | Mueller | 333—25 |
| 2,973,490 | 2/1961 | Schlicke | 333—79 |

HERMAN KARL SAALBACH, Primary Examiner

C. BARAFF, Assistant Examiner

U.S. Cl. X.R.

333—12, 25, 79